(12) United States Patent
De Araujo et al.

(10) Patent No.: US 10,838,516 B2
(45) Date of Patent: Nov. 17, 2020

(54) SIX DEGREES OF FREEDOM TRACKING OF OBJECTS USING SENSORS

(71) Applicant: Tactual Labs Co., New York, NY (US)

(72) Inventors: Bruno Rodrigues De Araujo, Toronto (CA); Ricardo Jorge Jota Costa, Toronto (CA); David Holman, Toronto (CA)

(73) Assignee: Tactual Labs Co., New York, NY (US)

( * ) Notice: Subject to any disclaimer, the term of this patent is extended or adjusted under 35 U.S.C. 154(b) by 93 days.

(21) Appl. No.: 16/006,294

(22) Filed: Jun. 12, 2018

(65) Prior Publication Data

US 2018/0364814 A1 Dec. 20, 2018

Related U.S. Application Data

(60) Provisional application No. 62/521,397, filed on Jun. 17, 2017.

(51) Int. Cl.
| | | |
|---|---|---|
| *G06F 3/0346* | (2013.01) | |
| *G06F 3/01* | (2006.01) | |
| *G01S 11/06* | (2006.01) | |
| *G01S 5/14* | (2006.01) | |
| *G01S 1/06* | (2006.01) | |
| *G06F 3/041* | (2006.01) | |

(52) U.S. Cl.
CPC ............ *G06F 3/0346* (2013.01); *G01S 1/06* (2013.01); *G01S 5/14* (2013.01); *G01S 11/06* (2013.01); *G06F 3/011* (2013.01); *G06F 3/041* (2013.01); *G06F 2203/04104* (2013.01); *G06F 2203/04108* (2013.01)

(58) Field of Classification Search
CPC ............ G06F 15/17381; G06F 15/803; G06F 2203/04104; G06F 2203/04108; G06F 3/011; G06F 3/0346; G06F 3/041; G01S 11/06; G01S 1/06; G01S 5/14
See application file for complete search history.

(56) References Cited

U.S. PATENT DOCUMENTS

| | | | |
|---|---|---|---|
| 6,549,004 B1 * | 4/2003 | Prigge | G01S 5/00 324/207.17 |
| 2004/0201857 A1 | 10/2004 | Foxlin | |
| 2007/0031151 A1 * | 2/2007 | Cunningham | H04B 10/1123 398/131 |
| 2009/0237564 A1 | 9/2009 | Kikinis et al. | |
| 2009/0243932 A1 * | 10/2009 | Moshfeghi | G01S 5/14 342/378 |

(Continued)

FOREIGN PATENT DOCUMENTS

KR  1020150086278  7/2015

*Primary Examiner* — Hong Zhou
(74) *Attorney, Agent, or Firm* — Adam Landa

(57) ABSTRACT

Disclosed is a sensor enabled object. Beacons may be placed at fixed locations within an environment. The movement of the sensor enabled object can be tracked throughout the environment by analyzing received signals. The relative distances from the known positions of the beacons can be used in order to orient the sensor enabled object within the environment. Alternatively, the sensor enabled objects can be used to determine the relative positions of mobile objects by measuring the respective distances from each other and correlating the relationships.

18 Claims, 7 Drawing Sheets

(56) References Cited

U.S. PATENT DOCUMENTS

| | | | |
|---|---|---|---|
| 2011/0238399 A1 | 9/2011 | Ophir et al. | |
| 2013/0099975 A1* | 4/2013 | Cyganski | G01S 5/0205 |
| | | | 342/432 |
| 2015/0318624 A1* | 11/2015 | Schantz | G01S 5/14 |
| | | | 343/867 |
| 2015/0372769 A1* | 12/2015 | Farr | H04B 10/80 |
| | | | 398/104 |
| 2016/0259404 A1 | 9/2016 | Woods | |
| 2018/0108179 A1* | 4/2018 | Tomlin | G02B 27/0172 |

\* cited by examiner

SIX DEGREES OF FREEDOM TRACKING OF OBJECTS USING SENSORS

This application claims the benefit of U.S. Provisional Application Ser. No. 62/521,397, entitled "6 DOF Tracking of Objects Using FMT Sensors," filed Jun. 17, 2017, the contents of which are hereby incorporated by reference.

FIELD

The disclosed apparatus and methods relate in general to the field of human-machine interface controllers, and in particular to tracking of objects in 3D environments.

BACKGROUND

In recent years virtual reality (VR) and augmented reality (AR) have become increasingly popular as computational power and immersive possibilities become more common. Generally, while systems and methods offer ways to interact with VR and AR environments, frequently the mechanism for interacting with these types of environments detracts from the immersive nature.

(Fast Multi-touch) FMT sensors have enabled low latency touch sensing on flat and curved surfaces based on orthogonal modulated signals. However FMT sensors have to date not been effectively implemented to track the position and orientation of objects in space.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

Figure 1:
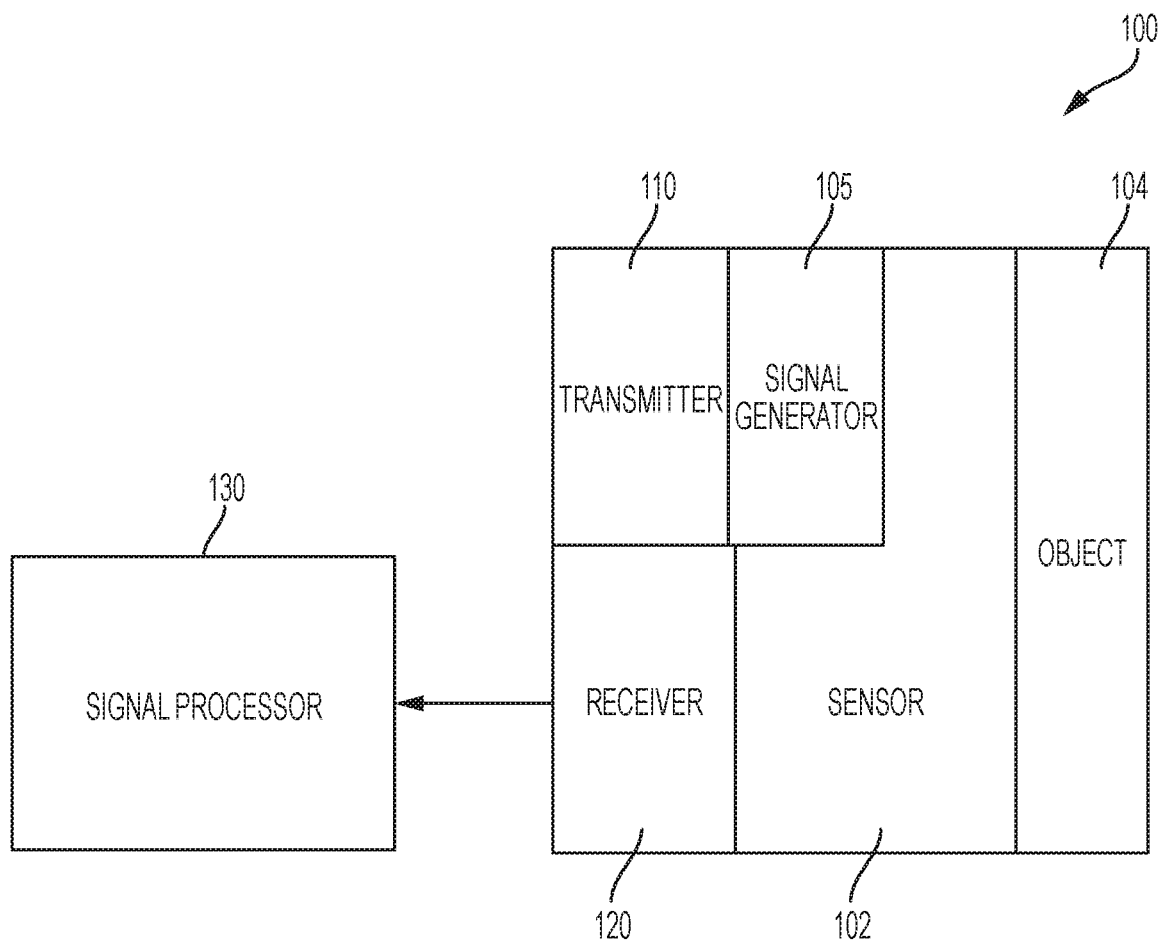
FIG. 1 shows a schematic diagram of a sensor enabled object.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

The present application is directed to using FMT sensor technology to track the position and orientation of objects in space. In VR/AR and mixed reality implementations, the methods and systems disclosed herein enable tracking of the position and orientation in 3D space of one or more FMT sensor enabled objects and/or frequency-emitting beacons. For example, the 3D movement in space of two FMT sensor-enabled handheld game controllers.

The presently disclosed systems and methods provide for designing, manufacturing and using FMT sensor technology, and particularly sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicant's prior U.S. patent application Ser. No. 13/841,436, filed on Mar. 15, 2013 entitled "Low-Latency Touch Sensitive Device" and U.S. patent application Ser. No. 14/069,609 filed on Nov. 1, 2013 entitled "Fast Multi-Touch Post Processing." These applications contemplate FDM, CDM, or FDM/CDM hybrid sensors which may be used in connection with the presently disclosed sensors. In such sensors, touches are sensed when a signal from a row is coupled (increased) or decoupled (decreased) to a column and the result received on that column.

This application also employs principles used in FMT sensors and other interfaces disclosed in the following U.S. Pat. Nos. 9,019,224 B2; 9,811,214 B2; 9,804,721 B2; 9,710,113 B2; 9,158,411 B2; the following U.S. patent application Ser. Nos. 14/466,624; 15/162,240; 15/690,234; 15/195,675; 15/200,642; 15/821,677; and PCT publication PCT/US2017/050547, familiarity with the disclosure, concepts and nomenclature therein is presumed. The entire disclosure of those applications and the applications incorporated therein by reference are incorporated herein by reference. Details of the presently disclosed sensors are described below.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being orthogonal to each other in frequency, in which case, they could not be the same frequency.

In various embodiments, the present disclosure is directed to systems and methods for tracking sensor enabled objects. Throughout this disclosure, various shapes and arrangements of sensor enabled objects are used for illustrative purposes. Although example shapes and arrangements are disclosed for the purpose of illustrating the invention, other shapes and arrangements will be apparent to a person of skill in the art, in view of this disclosure, without departing from the scope and spirit of the disclosure herein.

The term "sensor enabled object" as used herein is intended to refer to a physical object (such as, for example a controller, movable object, body part, etc.) that is detectable and/or interactable via FMT sensors. The interactibility and/or detectability is typically provided detection and analysis of signals through the use of signal processors.

In an embodiment, a FMT sensor is capable of detecting touch and hover in addition to the environmental location discussed herein. In an embodiment, frequency infusion (injection) is also used to generate additional signals that can be used to enhance and improve environmental location as well as other types of sensor capabilities. Frequency infusion refers to transmitting orthogonal frequencies through another conductive channel (e.g., a body or a stylus) and having those frequencies detected by receivers. Frequency infusion can be used to identify devices such as one or more styluses, or hands interacting with a display or object. Frequency infusion can be used to increase the range of sensing of FMT sensors and/or to enable hover sensing in a close range of the FMT sensor by transmitting orthogonal frequencies outside of the FMT sensors. The systems and methods disclosed herein permit tracking of 3D location and orientation of a sensor enabled object.

The system and method discussed herein uses antennas (conductors) that function as transmitters and receivers. However, it should be understood that whether the antennas are transmitters, receivers, or both depends on context and the embodiment. When used for transmitting, the antenna is operatively connected to a signal generator. When used for receiving, the antenna is operatively connected to a signal receiver. In an embodiment, the transmitters and receivers for all or any combination of arrangements are operatively connected to a single integrated circuit capable of transmitting and receiving the required signals. In an embodiment, the transmitters and receivers are each operatively connected to a different integrated circuit capable of transmitting and receiving the required signals, respectively. In an embodiment, the transmitters and receivers for all or any combination of the arrangements may be operatively connected to a group of integrated circuits, each capable of transmitting and receiving the required signals, and together sharing information necessary to such multiple IC configurations. In an embodiment, where the capacity of the integrated circuit (i.e., the number of transmit and receive channels) and the requirements of the patterns (i.e., the number of transmit and receive channels) permit, all of the transmitters and receivers for all of the multiple arrangements used by a controller are operated by a common integrated circuit, or by a group of integrated circuits that have communications therebetween. In an embodiment, where the number of transmit or receive channels requires the use of multiple integrated circuits, the information from each circuit is combined in a separate system. In an embodiment, the separate system comprises a GPU and software for signal processing.

The term antenna is often used interchangeably with the term conductor when referring to the interacting pairs within the system. Specifically, where a signal is transmitted on one antenna/conductor, a field is created between that antenna/conductor and one or more other antennas/conductors (e.g., at least one receiver antenna—but there can be many). The field created can be disturbed by certain kinds of interactions, e.g., the presence of human body parts or other objects. Sensing can be accomplished by measuring small changes in the field. Information can also be ascertained by determining the strength of signal received by a receiver. In an embodiment, changes in the magnitude of a signal received at the receiver are measured and used to derive sensing information. In an embodiment, changes in the phase of a signal received at the receiver are measured and used to derive sensing and location information. In an embodiment, sensing and location relies on the combination of multiple measurements (e.g., magnitude and phase), including measurements made by other sensors. It will be apparent to a person of skill in the art in view of this disclosure that although the elements that operatively join the antennas/conductors described herein with the driving or receiving circuitry (e.g., signal generators or signal receivers) may be conductive and may even be referred to as a conductor, it does not refer to the conductor/antenna for sensing interactions.

Turning to FIG. 1, shown is a diagram that generally sets forth an example of a sensor enabled object 100. The sensor 102 comprises a transmitter 110 that is operably connected to a signal generator 115. In an embodiment, the sensor 102 also comprises a receiver 120. The receiver 120 is operably connected to a signal processor 130.

The sensor enabled object 100 incorporates the abilities of the sensor 102 in order to be tracked within the 3D environment. In an embodiment, the sensor 102 may be secured to an object 104. In an embodiment, the sensor 102 is embedded within an object 104. In an embodiment, the sensor 102 is removably attached to the object 104. In an embodiment, the sensor 102 is associated with an object 104 in a known relationship. In an embodiment, the sensor 102 may not be physically connected to the object 104 yet still may be associated with it so that the location of that specific object 104 may be known within the 3D environment and still be a sensor enabled object 100.

Signals received by the receiver 120 are sent to and processed by a signal processor 130. The signal processor 130 may be located on the sensor enabled object 100 or operably located elsewhere. The signal processor 130 can be connected via wires or wirelessly connected. In an embodiment the signal generator 105 and the signal processor 130 are part of a single mixed integrated circuit. In an embodiment, an analog front end comprising a transmitter (or multiple transmitters) and a receiver (or multiple receivers) is used to send and receive signals. In such an embodiment, the analog front end provides a digital interface to signal generating and signal processing circuits and/or software).

The object 104 can be a device, article of clothing, piece of jewelry, adhesive article, body part, headset, controller, etc. In an embodiment, the object 104 can be a display or any planar surface that is equipable with a sensor 102 (or just the receive side thereof). In an embodiment, the object 104 can be a curved or shaped object such as a remote controller, game controller, keyboard or mouse device equipable with a sensor 102.

In an embodiment, the sensor enabled object 100 has multiple sensors 102 connected thereto. In an embodiment the sensor 102 has multiple transmitters 110 connected thereto. In an embodiment the sensor 102 on the sensor enabled object 100 has multiple receivers 120 connected thereto. In an embodiment, the sensor enabled object 100 has multiple transmitters 110 and multiple receivers 120 connected thereto. In an embodiment, each sensor 102 on the sensor enabled object 100 has only one transmitter 110. In an embodiment, the sensor each sensor 102 on the sensor enabled object 100 has only one receiver 120.

It will be apparent to a person of skill in the art in view of this disclosure that the transmitter 110 and receiver 120 and their respective antennas can be switched. That is to say that the transmitter 110 can perform as a receiver 120 in some instances and the receiver 120 can perform as a transmitter 110 in some instances and vice versa. Furthermore, their respective roles may alter or vary in a known and predetermined manner depending on the implementation. It will also be apparent to a person of skill in the art in view of this disclosure that the signal processor 130, transmitter 110 and receiver 120 may be implemented on separate circuits as well as the same circuit.

In an embodiment, the signal generator 105 is adapted to generate one or more signals and send the signals to the transmitters 110. In an embodiment, the signal generator 105 is adapted to generate a plurality of frequency-orthogonal signals and send the plurality of frequency-orthogonal signals to the transmitters 110. In an embodiment, the signal generator 105 is adapted to generate a plurality of frequency-orthogonal signals and send one or more of the plurality of frequency-orthogonal signals to each of a plurality of transmitters 110. In an embodiment, the frequency-orthogonal signals are in the range from DC up to about 2.5 GHz. In an embodiment, the frequency-orthogonal signals are in the range from DC up to about 1.6 MHz. In an embodiment, the frequency-orthogonal signals are in the range from 50 KHz to 200 KHz. The frequency spacing between the frequency-orthogonal signals should be greater than or equal to the reciprocal of the integration period (i.e., the sampling period).

In an embodiment, the signal processor 130 is adapted to determine at least one value representing each frequency orthogonal signal transmitted by a transmitter 110. In an embodiment, the signal processor 130 performs a Fourier transform on the received signals. In an embodiment, the signal processor 130 is adapted to digitize received signals. In an embodiment, the signal processor 130 is adapted to digitize received signals and perform a discrete Fourier transform (DFT) on the digitized information. In an embodiment, the signal processor 130 is adapted to digitize received signals and perform a Fast Fourier transform (FFT) on the digitized information.

In an embodiment, received signals are sampled at at least 1 MHz. In an embodiment, received signals are sampled at at least 2 MHz. In an embodiment, received signals are sampled at 4 Mhz. In an embodiment, received signals are sampled at more than 4 MHz.

For example, to achieve KHz sampling, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. In an embodiment, the frequency spacing is equal to the reciprocal of the integration period. It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, an FFT is used to transform the digitized received signals into bins of information, each reflecting the frequency of a frequency-orthogonal signal transmitted which may have been transmitted by the transmit antenna 115. In an embodiment 4096 bins correspond to frequencies from 1 KHz to about 4 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

Figure 2:
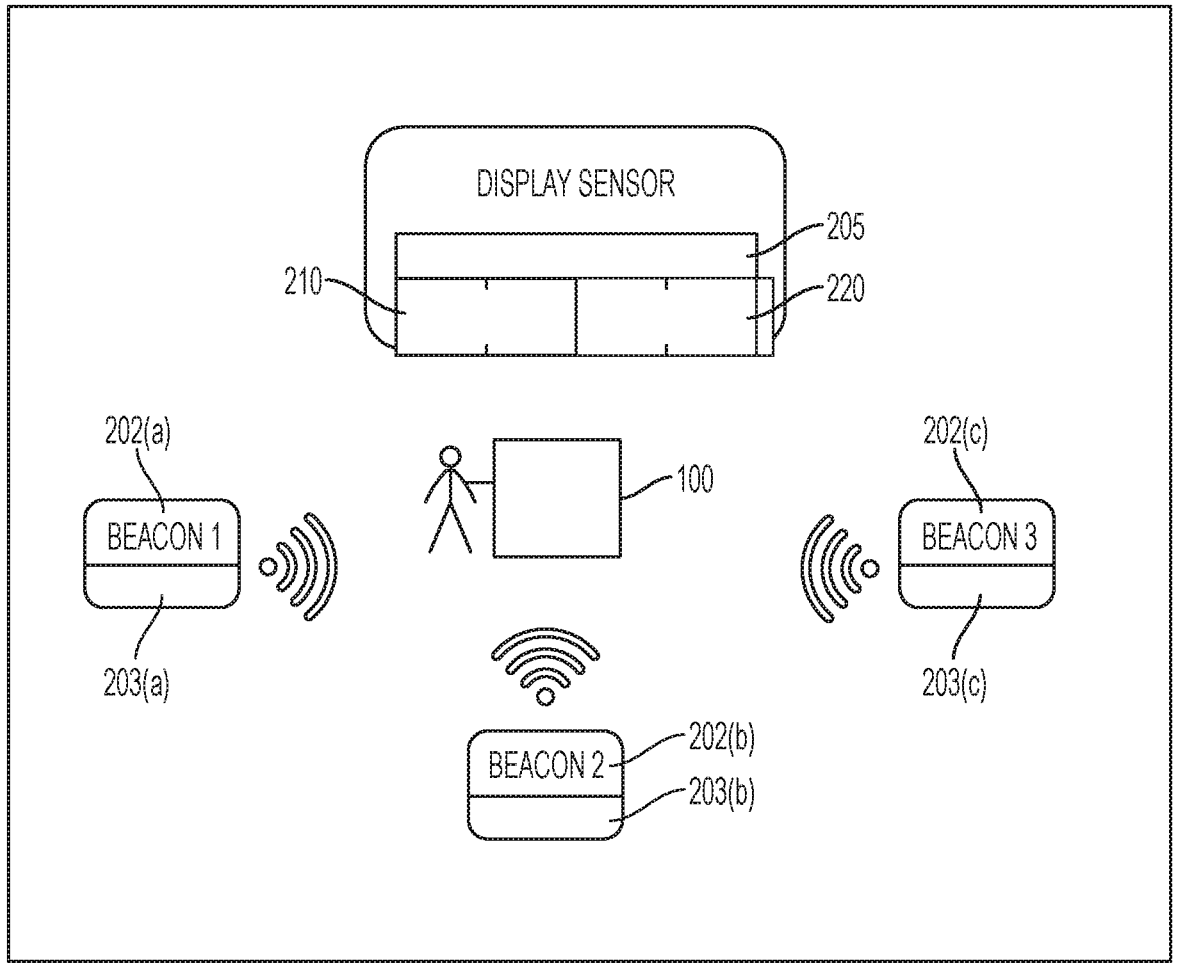
FIG. 2 is a diagram of a system employing the sensor enabled objects and sensors.

Turning to FIG. 2, a simple diagram is shown illustrating the implementation of a sensor enabled object 100. FIG. 2 illustrates an embodiment, where a sensor enabled object 100 is tracked in a three dimensional (3D) space using beacons 202(a)-202(c) located within the environment. The beacons 202(a)-202(c) transmit multiple frequency signals through the medium within the environment. In this instance the medium is air. In an embodiment, the beacons 202(a)-202(c) transmit multiple frequency signals through the air and/or through the body of a user. In an embodiment, the beacons 202(a)-202(c) transmit multiple frequency signals through the body. In an embodiment, the beacons 202(a)-202(c) transmit multiple frequency signals through some other medium, such as a conductive medium or through a medium, such as water.

In FIG. 2, the beacons 202(a)-202(c), comprise transmitters 203(a)-203(c). When functioning within the system the beacons 202(a)-202(c) transmit a signal that is frequency orthogonal to every other signal that is being transmitted in the system.

Still referring to FIG. 2, beacons 202(a)-202(c) transmit frequency signals through the air. Other sensor enabled objects 100 may be located within the system and may additionally transmit signals via transmitters 110. These signals can be detected by the sensor 102 located on the sensor enabled object 100 having at least receiver 120. The received signals are processed by the signal processor 130 which extracts the signal strengths of each signal frequency used by a transmitter 110 and/or beacons 202(a)-202(c).

By using the relative geometric properties of the receivers 120 on the sensor 102 and a prior calibration of the signal strength used as a reference, distance measurements can be estimated for each receiver 120 by correlating with the signal strengths of the signal frequencies from the beacons 202(a)-202(c). Given the prior knowledge of where these receivers 120 are physically located around the object 104, as well as the knowledge of their relationship with respect to the beacons 202(a) and other transmitters 110, the position and orientation of the sensor enabled object 100 can be reconstructed using the technique of multiple distance estimation.

The sensors 102 are able to extract individual signal strengths for each existing orthogonal frequency signal using spectrum analysis, such as the DFT/FFT methods discussed above, on top of the data sampled at the receiver locations. Given a pair of transmitters and receivers (located on either the beacons 202(a)-202(c) or sensor enabled object 100), where the transmitter is located at a given distance from the receiver, the measured signal strength at the receiver location correlates to the distance between both receivers and transmitters. When the receiver is close to the transmitter, the signal strength of the frequency generated by the transmitter is higher than when the receiver is located further from the transmitter. This property of the signal permits the generation of an individual distance estimation. The individual distance estimation corresponds to the physical distance between the transmitter and the receiver.

Multiple distance estimations from each frequency and receiver can be obtained by combining multiple receivers and/or transmitters that are using different frequencies. In an embodiment, a triangulation is performed using three distance estimations and a set of three known physical locations to compute a 3D position of the tracked sensor enabled object 100. The known physical location can be defined in two ways depending on how the transmitters and receivers are used with the sensor enabled object 100 or the beacons 202(a)-202(c). One way is to perform a calibration process to create a reference ground truth measurement. Another way is to have the relative positions of the receivers or transmitters predetermined and established.

Primarily the triangulation techniques are based on defining linear or non-linear systems which can be solved by reduction, minimization, optimization or machine learning based methods. The method that is used depends on the amount of measurements that can be collected and the set of unknown variables. Multiple distance estimations permit the collection of more data to better solve the unknown variables. These unknown variables can represent the 3D position (x,y,z) of the sensor enabled object 100, or/and its orientation within the 3D environment by representing the 6 degrees of freedom in which the sensor enabled object 100 can move. Thus the sensor enabled objects position and movement along the x, y and z axes as well as its roll, pitch and yaw.

Beyond the multiple signal strength measurements collected from several receivers or representing several transmitters, the geometry and pattern of the sensors 102 that are used on the sensor enabled object 100 or on beacons 202(a)-202(c) are known. This geometry of the sensors 102 defines a set of relative distances between the transmitter and receivers of the sensor 102. At a receiver not located on the sensor 102, such as one located on the beacons 202(a)-202(c), the receiver will be able to collect multiple signal strength measures of the transmitters 110 located on the sensor 102. In a different scenario, distant transmitters not located on the sensor 102, such as on beacons 202(a)-202(c) are collected and multiple signal strength measurements of the transmitted signals at the receivers 120 of the sensor 102 are determined. In both scenarios, the collected measurements can be translated into distance measurements and are combined with the relative known distances between the transmitters 110 and receivers 120 on the sensor enabled object 100. The know distances between the transmitters 110 and receivers 120 on the sensor enabled object 100 are defined by the sensor design and the design of the sensor enabled object 100 and are encoded linearly or nonlinearly as relations into the solving system used by the system. The measurements and analysis can contribute to defining the unknown variables corresponding to the 6 degrees of freedom information of the sensor enabled object 100 to be computed and estimates. These measurements can be implemented into the microcontroller of the sensor 102 and be processed by the signal processor 130. These measurements can be performed as an additional step following the FFT spectrum analysis or internal heatmap generation implemented when using the FMT sensors.

Still referring to FIG. 2, beacons 202(a)-202(c) each transmit a signal that is orthogonal with each other transmitted signal that is transmitted during any given frame in the system. In an embodiment, the transmitted signals are frequency orthogonal to each other. The orthogonality of each of the signals with respect to each other permits the system to distinguish signals from each other.

The sensor enabled object 100 shown in FIG. 2 is a controller used within the system that is able to interact within a VR or AR environment that is being produced by the system. The sensor enabled object 100 has its own transmitter 110 and receiver 120. The transmitter 120 transmits signals that are orthogonal to each other signal transmitted during a given frame. The signals transmitted by the transmitter 120 can be used to calibrate the location of the sensor enabled object 100 with other components of the system and/or other sensor enabled objects 100 that are operating within the system.

Also shown in FIG. 2 is display sensor 205. In an embodiment, display sensor 205 has its own set of transmitter(s) 210 and receiver(s) 220. The signals transmitted by the transmitter(s) 210 are frequency orthogonal with each other signal transmitted within the system during each frame. The signals transmitted by the transmitter 210 can be used to calibrate the location of the sensor enabled object 100 with other components of the system.

During operation, each signal that is transmitted during any given frame is received and analyzed. The signals can be received at both the display sensor 205 and the sensor 102. The signals can be analyzed and used to establish the location and relative position of the object 104 within the 3D space. The position and location can be established with respect to the display sensor 205 and the sensor 102.

In an embodiment, the position and orientation of the tracked object 104 may be estimated by computing the signal strength of each frequency signal on each receiver 120 of the sensor 102. Given the physical sensor layout and characteristics, the signal strength of received externally-emitted frequencies will fall depending on how far that receiver 120 is from the transmitters, such as beacons 202(a)-202(c), or transmitter 210 of the display sensor 205, and increases when the object is closer to the transmitter 210. For the same frequency, the signal strength will vary depending, as mentioned before, on its location relative to the transmitter 210 as well as depending on its location within the sensor 102. For a given sensor design and its combination of receivers 120 and transmitters 110, the relative geometrical characteristic of the receiver channels regarding the sensor enabled object 100 can be measured, computed and stored into the device, or within a portion of the system adapted to process the information. These values can be used to define a mathematical model correlating the position and orientation of the device depending on how it is oriented with respect to a given transmitted signal. Such a model can be determined using prior measurements or be acquired using a semi-supervised process knowing a ground truth position and orientation by using another tracking or measurement technology.

In an embodiment, the beacons 202(a)-202(c) are located at different fixed locations in space with each transmitting a different frequency in an unused frequency range than those used by the transmitters 110 on the sensor enabled object 100. The transmitting frequencies used by each beacon 202(a)-202(c) are within the range of the signal frequencies that can be captured by the sensor enabled object 100 to be tracked. The fixed locations of the beacons 202(a)-202(c) are used in order calibrate and determine the location of sensor enabled object 100 within the 3D environment.

In an embodiment, two or more beacons 202(a)-202(c) are used equidistantly from a known reference point defining the center of a tracking area. The tracking area can be delimited by the achievable transmitting range of the transmitted beacon signals and can be controlled by the power (such as voltage increase) of the transmitted signal or the range of the frequency used by the beacons 202(a)-202(c).

In an embodiment, a calibration procedure using sensor enabled object 100 can be defined by capturing the different frequency signal strengths at different locations and orientations, thereby sampling and delimiting the tracking area of the sensor enabled object 100. In an embodiment, beacons 202(a)-202(c) include signal receivers to identify and estimate the location of the other beacons and auto-calibrate distance estimation of the object 104 within the tracking area limits.

In an embodiment, several beacons 202(a)-202(c) with different signal frequencies can be used to extend the limits of the tracking area or enable a more accurate position and orientation tracking error.

Figure 3:
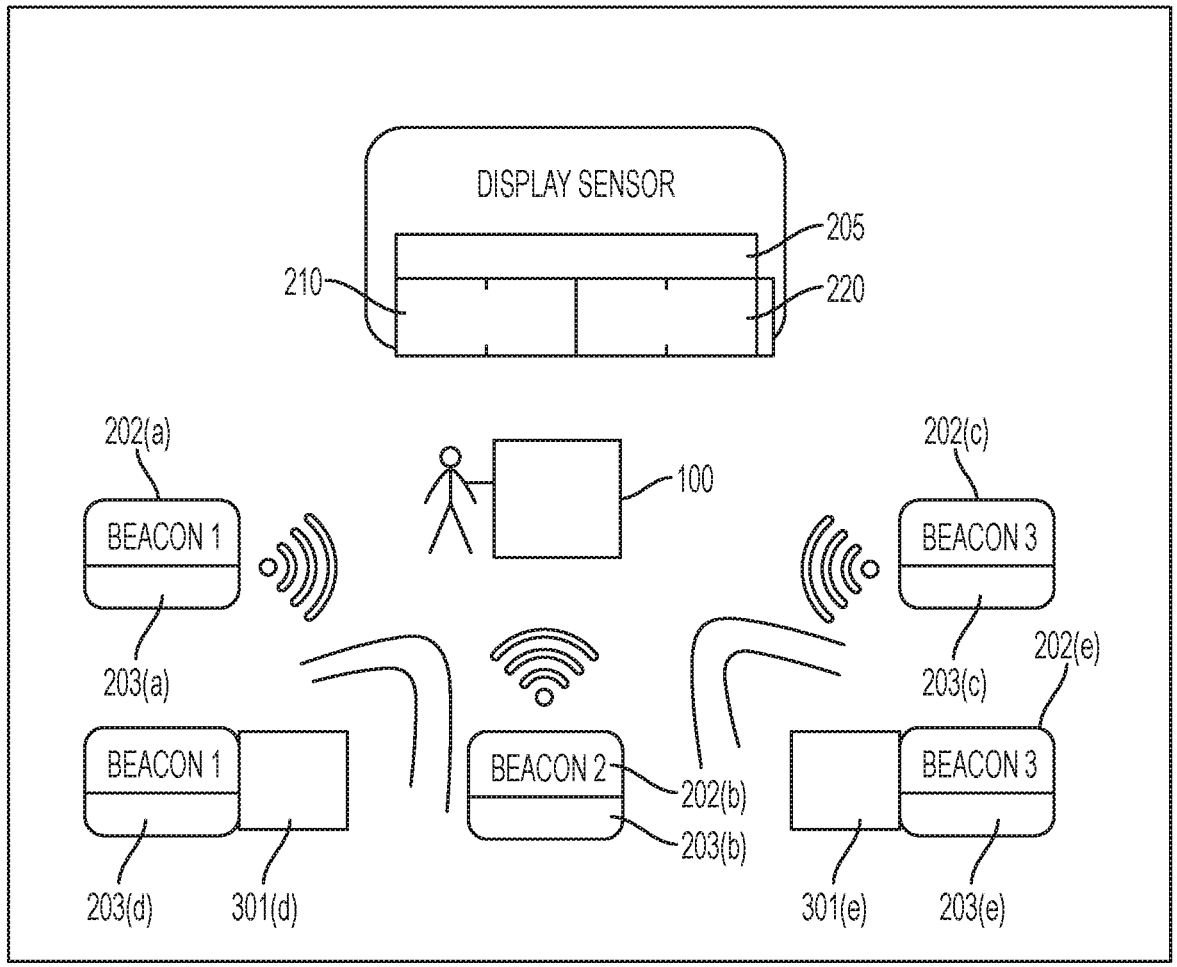
FIG. 3 is a diagram of a system employing the sensor enabled objects and beacons.

Turning to FIG. 3, shown is a system where beacon 202(d) and beacon 202(e) each have diffusers 301(d) and 301(e). The beacons 202(a)-202(e) have transmitters 203(a)-203(e) that send the signals through the air. The beacons 202(d) and 202(e) send the signal to diffusers 301(d) and 301(e) in order to change the output range of the transmitted signal. The output range of a diffused signal is generally broader in area (within the 3D environment) but shorter in terms of effective distance. In an embodiment, the beacons 202(d) and 202(e) send the signal through a body in order to change the output range of the signal. In an embodiment, the beacons 202(a)-202(c) transmit signals in a directed manner, such as in a tight beam. The range of a tight beam is narrower in terms of area (within the 3D environment) but longer in terms of effective range.

Still referring to FIG. 3, beacons 202(d) and 202(e) transmit signals to the diffuser surface of the diffusers 301(d) and 301(e) that spreads the signal out. Directed signals are able to be detected at a further distance, while the diffused signals are typically detected at a distance that is less than the distance at which the directed signal is detected. However the transmitting range of any given signal can be determined and controlled by the power (such as the voltage increase) or the range of the frequency used by the beacons. By intermixing the two types of transmitted signals, i.e., directed and diffused, within a system, various ranges and nuances of 3D location can be achieved.

Figure 4:
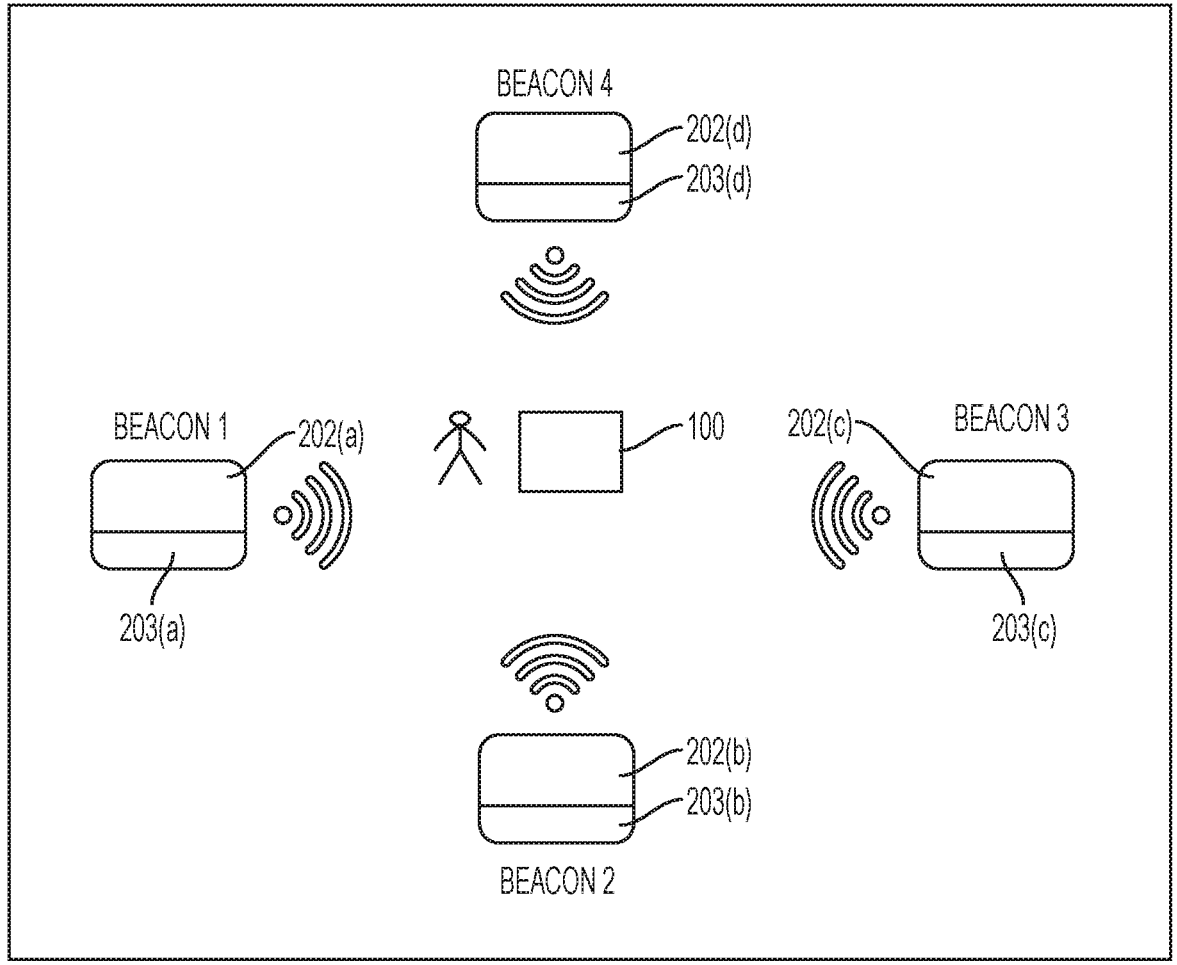
FIG. 4 is a diagram of a system employing the sensor enabled objects and beacons.

Referring to FIG. 4, in an embodiment, beacons 202(a)-202(d) use different signal frequencies located at fixed locations that can track a sensor enabled object 100, such as one handheld game controller or two controllers, one for each hand. The known positions of the beacons 202(a)-202(d) permit accurate calibration of the sensor enabled object 100 within the delineated environment. The controllers can be used in a VR/AR/Mixed reality scenario that involves extracting real-time position and orientation in a limited tracking area depending on the number of beacons. In an embodiment, the controller is able to sense the pose of a hand using its local tracking capabilities. The controller can also be a sensor enabled object 100. The systems and methods described herein allow tracking e.g., the hand of a user in 3D space as well the local positioning of a user's hand. In an embodiment, it is possible to use the sensor 102 for both the 3D positioning and determination of localized body movement, such as the hand.

Figure 5:
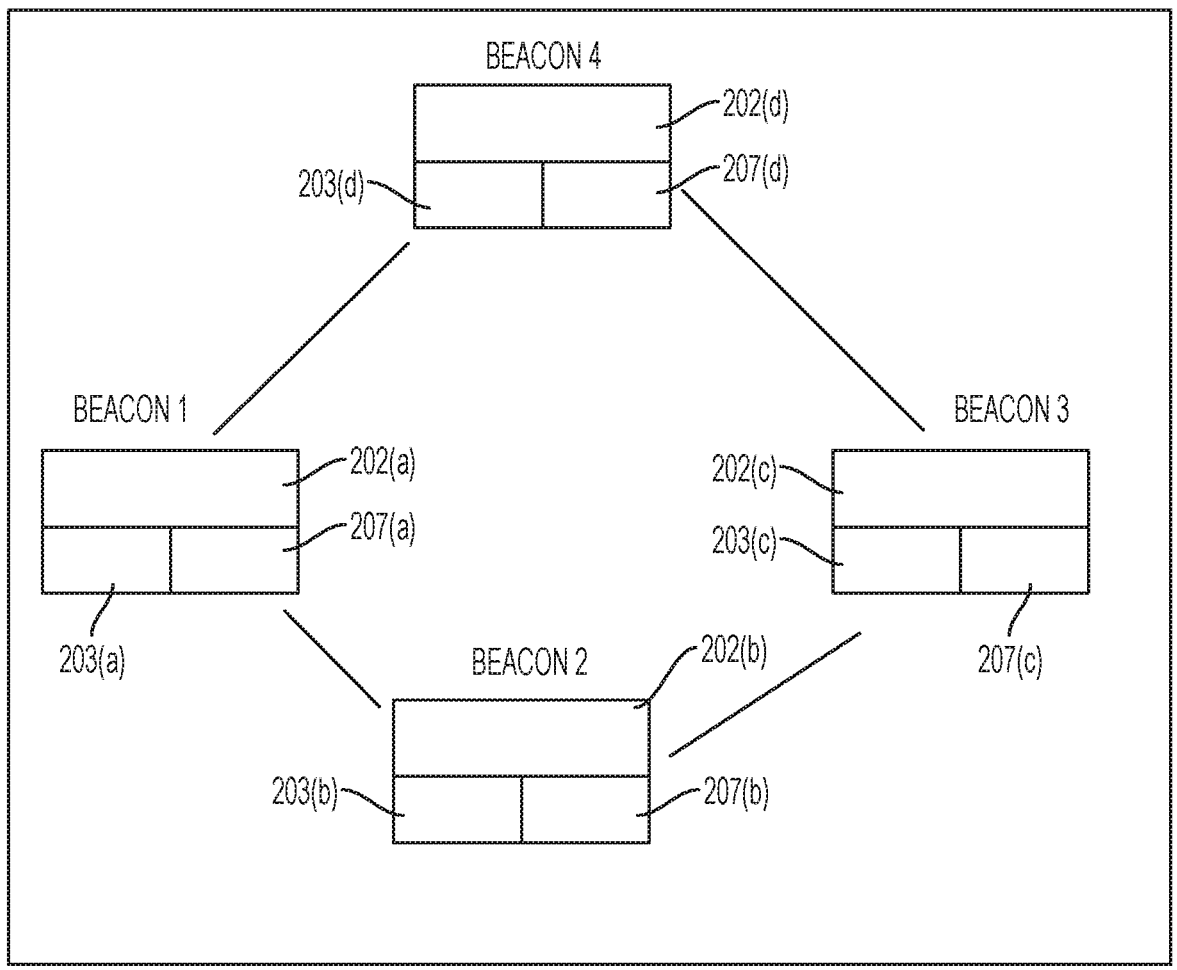
FIG. 5 is a diagram of a system employing the sensor enabled objects and beacons.

Referring to FIG. 5, the beacons 202(a)-202(d) each include receivers 207(a)-207(d) in addition to the transmitters 203(a)-203(d). Each of the beacons 202(a)-202(d) can both transmit and receive signals. Each of the transmitted signals can comprise a unique orthogonal signal that can be received and processed on each of the other beacons.

For example, beacon 202(a) can transmit a unique orthogonal signal with a frequency f1. The signal propagates from the beacon 202(a) through the room and is received at beacons 202(b)-202(d). The signal is then processed and analyzed to produce a measurement that is indicative of the distance each of the beacons 202(b)-202(d) is from beacon 202(a). In an embodiment, any change in the measurement of the received signal can be indicative of a change occurring within the bounded area. In an embodiment, the measurements are used to reconstruct the movement of an object within the bounded area. In an embodiment, the movement of a sensor enabled object 100 within the bounded area is used to enable and analyze activity within that bounded area. For example, movement towards the beacon 202(a) could produce a reaction within a VR/AR or real world environment in which the sensor enabled object 100 is interacting.

Additionally, each of the beacons 202(a)-202(d) having both the transmitters 203(a)-203(d) and receivers 207(a)-207(d) can be used to self-calibrate their locations within the system. Any additional beacon can also be added to the system and that beacon can then communicate with the other beacons in order to establish its location. In an embodiment, there is fixed and movable beacons that combine their interactions in order establish the boundaries of the monitored environment.

Figure 6:
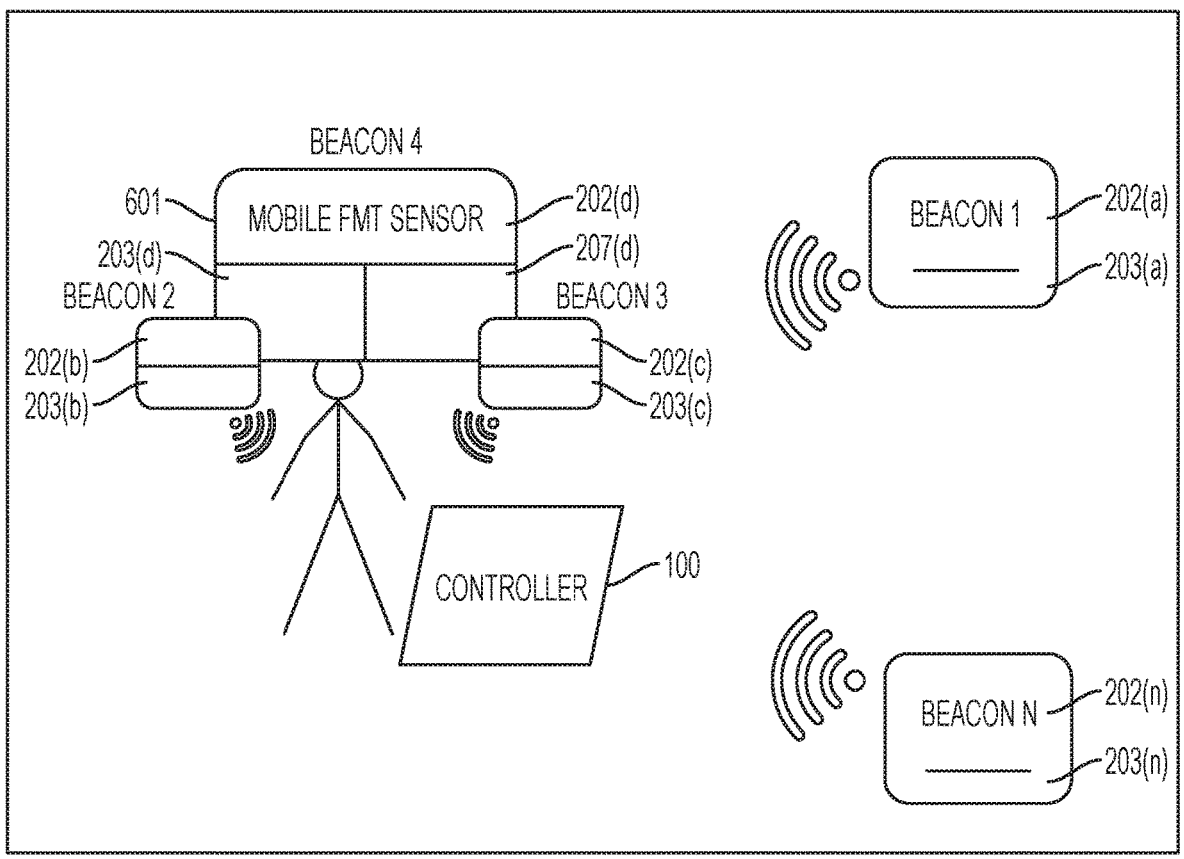
FIG. 6 is a diagram of a system employing the sensor enabled objects and beacons.

Referring to FIG. 6, in an embodiment, two or more beacons 202(a)-202(n) using different signal frequencies are located within a given environment. A person can have a plurality of sensor enabled objects 100 located on their body or used as controllers. Additionally, the person may be wearing a head mounted display 601 and the head mounted display 601 may have a number of beacons 203(b)-203(d) that have transmitters 203(b)-203(d). Additionally, the head mounted display 601 may also have a beacon 202(d) that has a receiver 207(d).

An individual may use the controllers or wearables that are sensor enabled objects 100 to interact with system. The head mounted display 601 may operate within a VR/AR/mixed reality scenario to determine the relative position and orientation of the sensor enabled object 100 with respect to displays located in the environment or within the head mounted display 601. In an embodiment, a person can have a plurality of sensor enabled objects 100 located on their body. In an embodiment, a person may be wearing a head mounted display 601 and have multiple controllers or wearables that are sensor enabled objects 100.

For example, a user may have a game controller that is a sensor enabled object 100. Transmitters 110 located within the sensor enabled object 100 can transmit signals to the head mounted display 601. The head mounted display 601 can be transmitting signals from the transmitters 203(b)-203(d) located thereon. The signals can be received by the sensor enabled object 100. Additionally, signals from beacons 202(a) and 202(n), which are located throughout the environment, are received by the respective head mounted display 601 and the sensor enabled object 100. The distinct transmitted signal frequencies will allow tracking the position and orientation of sensor enabled object 100 and head mounted display 601 within the environment. In this embodiment, multiple sensor enabled objects 100 can be communicating their relative positions to each other. In other words the movement of each of the sensor enabled objects 100 can communicate with each other their location within 3D space with respect to each other.

In an embodiment, each of the sensor enabled objects 100 may also have further FMT sensor capability for the specific object. For example, in an embodiment, the controller senses the pose of the hand using its local tracking capabilities via FMT sensors, and the systems and methods described herein allow tracking of the hand of the user while the user is using the head mounted display 601 to track and display in 3D space.

Figure 7:
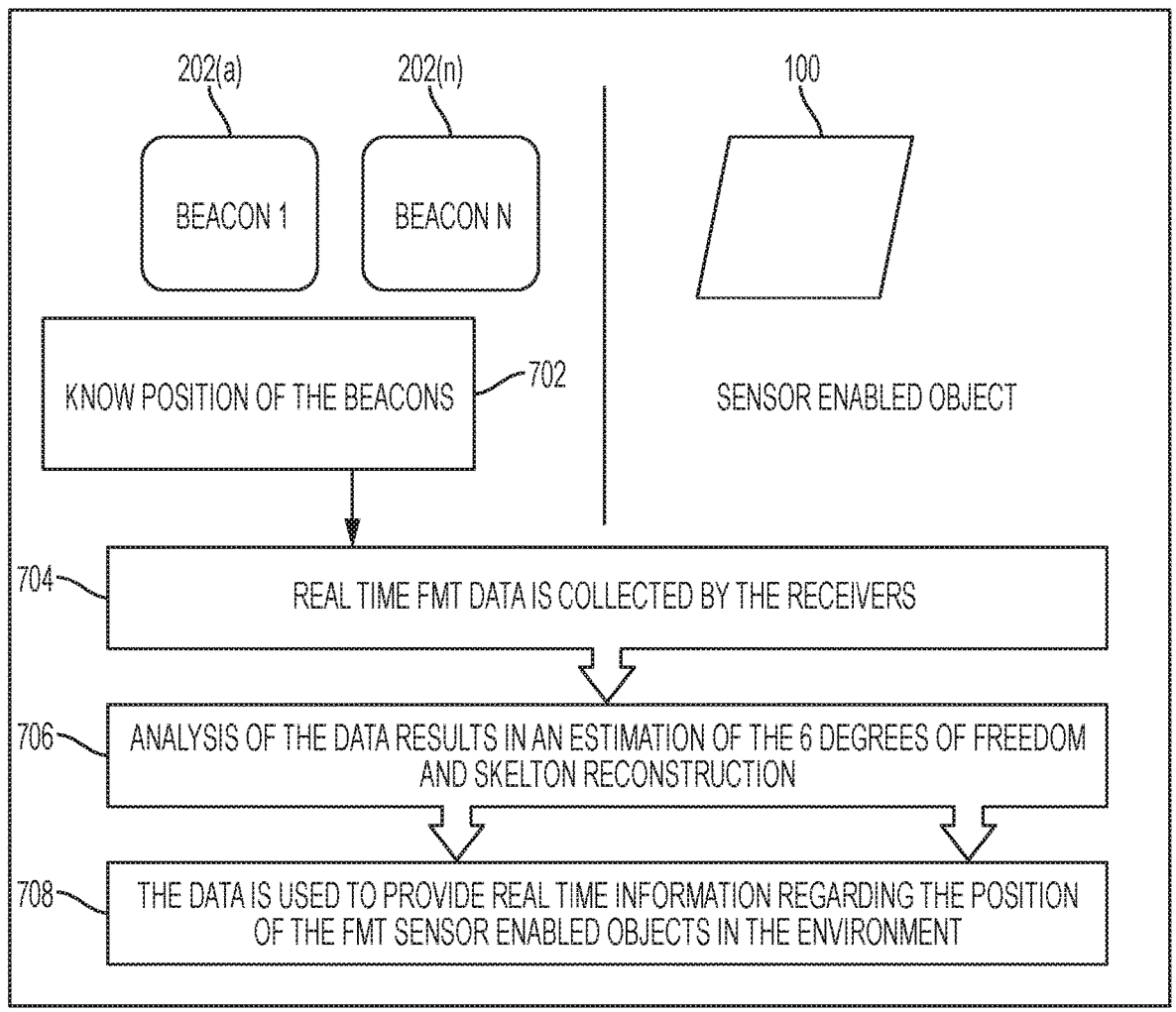
FIG. 7 is a diagram illustrating a use of the system.

FIG. 7 sets forth a flowchart providing an overview of the system method and arrangement. In FIG. 7, at step 702, the position of the beacons 202(a)-202(n) are known. In step 704, a sensor enabled object 100 is located within operable distance of the system. In step 706, real time data is collected by the receivers 120 and receivers 207(*a*)-207(*n*) from both the beacons 202(*a*)-202(*n*) and the sensor enabled object 100. In step 708, the analysis of the data results in an estimation of the 6 degrees of freedom movement of the sensor enabled object 100 using the known position of the receivers 207(*a*)-207(*n*) and receivers 120 as well as the analysis of the unique signals. Additionally, skeleton reconstruction data can be determined based on the use of additional FMT sensors on the sensor enabled object 100. In step 710, this information is used to provide real time information regarding the position of the sensor enabled object(s) 100 in the environment. Additionally, reconstruction of skeleton data is also provided in order to reconstruct and display detailed movement within a VR/AR environment.

In an embodiment, the sensor enabled objects 100 and the respective beacons 202(*a*)-202(*n*) can be mobile or fixed. Their relative positions can be determined based upon predetermined relationships and/or determined based on measurements occurring in real time of each of the unique received signals. In an embodiment, the position of the beacons 202(*a*)-202(*n*) and the sensor enabled objects 100 do not have to be known and can be determined based on the positional relationship of each one with each other. In an embodiment, the measurements use signal strength to determine distance between sensor enabled objects 100 and beacons 202(*a*)-202(*n*). The relationship is generally governed by the inverse square law. Knowing the initial location and power of the transmitter signal can be used in order to determine distance. In an embodiment, the measurements used can be based on the cross correlation of signals received at one sensor enabled object 100 or beacon 202(*a*)-202(*n*) and another. In an embodiment, triangulation is used to determine the relationship and location within the 3D environment. In an embodiment, the six degrees of freedom and the interaction of the sensor enabled object 100 can be enabled based upon the placement and local geometry of the various sensors 102 located on the object 104. In an embodiment, skeleton data is added to the positional information to further construct virtual environments or other interactive environments.

In an embodiment, inertial movement units (IMUs) are incorporated into the system to provide additional information directed to the user's movements. In an embodiment, mobile phones may be tracked using a signal from the mobile phones and the sensor enabled objects 100 and beacons 202(*a*)-202(*n*).

In an embodiment, global positioning data can be used to supplement positional information within the system in order to provide additional environmental information. In an embodiment, two different systems complement each other as global and local systems. The global and local systems can provide an overall better total system. The local system can use the slower, more accurate measurements to rebase measurements that are coming from the faster measurements that may be less accurate than the rebasing measurement. These complementary systems are used to rebase the system within a certain time frame. The high frequency updates are used for local updates until the next global update is available.

In an embodiment, the system disclosed above provides the local positioning while another system provides the global positioning. In an embodiment, the system disclosed above provides global positioning data while another system provides localized positioning. In an embodiment, the system disclosed above provides the localized positioning while an optical tracking system provides the global positioning rebasing system. In an embodiment, the system disclosed above operates alongside with IMU based devices. The IMU devices provide global rebasing for the system. In an embodiment, magnetic trackers inside a VR headset are utilized for global positioning and the system disclosed above is utilized for localized hand positioning to the headset. In an embodiment, global positioning can be achieved using optical devices.

In an embodiment, very small transmitters and receivers are positioned directly on a variety of nearby locations on the body and/or in the environment, and can detect relative movement with respect to one another. These transmitters and receivers can function as the beacons and the sensor enabled objects. That relative movement can be used to infer movement or positions of nearby body parts with respect to each other and in the environment. In an embodiment, transmitters and receivers are affixed to the hair, hair follicles or skin using small amounts of adhesive. In an embodiment, quantified changes can additionally be used to deduce sounds or speech from the vibration and movement of vocal cords. In an embodiment, quantified changes can be used to determine respiration, heart activity, pulse or other biomechanical changes. This additional information can supplement the VR/AR experience.

In an embodiment, the location of transmitters and receivers can be dynamically re-configured, allowing each to operate as either a transmitter or a receiver during any integration period. In an embodiment, an antenna can be used as both a transmitter and a receiver (albeit of different frequency-orthogonal signals) during a single integration period. In an embodiment, two groups of antenna are used as both transmitters and receivers during the same integration period; the first group of antenna has its received signals passed through a high pass filter and are used to transmit only low frequencies, while the second group of antenna has its received signals passed through a low pass filter and transmit only high frequencies.

In an embodiment, a VR/AR system for providing six degrees of freedom tracking is used comprising a headset comprising at least two beacons, wherein each of the at least two beacons comprises a transmitter, wherein each of the transmitters is adapted to transmit signals; a sensor enabled object, wherein the sensor enabled object is a hand controller, the sensor enabled object comprising a receiver adapted to receive signals, wherein the sensor enabled object is further adapted to determine hand position; a signal processor, wherein the signal processor receives signals from the receiver; the signal processor adapted to process the received signals and determine a measurement for each received signal from the at least two beacons, wherein a position of the sensor enabled object is determined based upon the measurements of the received signals; and wherein the sensor enabled object can be moved with six degrees of freedom and the position of the sensor enabled object is represented in a 3D environment produced by the VR/AR system.

In an embodiment, a method for tracking movement within a 3D environment is used comprising transmitting signals from at least two beacons located within the 3D environment; receiving signals from at least one of the at least two beacons at a sensor enabled object having at least one receiver, wherein the sensor enabled object is located within the 3D environment and can be moved with six degrees of freedom; processing received signals with a signal processor, wherein the processing of the received signals determines a measurement for each received signal that occurs within the 3D environment; and determining a position of the sensor enabled object based upon the determined measurements, wherein the position is a position within the 3D environment.

In an embodiment, a system for tracking movement is used comprising at least two beacons, wherein each of the at least two beacons comprises a transmitter, wherein the transmitter is adapted to transmit signals; a sensor enabled object comprising a receiver adapted to receive signals; and a signal processor, wherein the signal processor receives signals from the receiver; the signal processor adapted to process the received signals and determine a measurement for each received signal from the at least two beacons, wherein a position of the sensor enabled object is determined based upon the measurements of the received signals.

While the invention has been particularly shown and described with reference to a preferred embodiment thereof, it will be understood by those skilled in the art that various changes in form and details may be made therein without departing from the spirit and scope of the invention.

What is claimed is:

1. A VR/AR system for providing six degrees of freedom tracking comprising:
    a headset comprising at least two beacons, wherein each of the at least two beacons comprises a transmitter, wherein each of the transmitters is adapted to transmit signals that are frequency orthogonal to each other signal transmitted;
    a sensor enabled object, wherein the sensor enabled object is a hand controller, the sensor enabled object comprising a receiver adapted to receive signals transmitted from the transmitters, wherein the sensor enabled object is further adapted to determine hand position;
    a signal processor, wherein the signal processor receives signals from the receiver; the signal processor adapted to process the received signals using a Fast Fourier Transform and determine a measurement for each received signal from the at least two beacons, wherein a position of the sensor enabled object is determined based upon the measurements of the received signals; and
    wherein the sensor enabled object can be moved with six degrees of freedom and the position of the sensor enabled object is represented in a 3D environment produced by the VR/AR system.

2. The system of claim 1, further comprising a diffuser operably connected to one of the at least two beacons.

3. The system of claim 2, wherein one of the at least two beacons transmits a signal more narrowly than one of the other of the at least two beacons.

4. The system of claim 1, wherein measurements of the received signals provide a magnitude for each received signal.

5. The system of claim 4, wherein the magnitude is related to distance from one of the at least two beacons.

6. The system of claim 1, wherein the position of the sensor enabled object is determined based upon the measurements of the received signals and cross-correlation of the measurements with respect to the at least two beacons.

7. The system of claim 1, wherein the position of the sensor enabled object is determined based upon the measurements of the received signals and a known position of the at least two beacons.

8. The system of claim 1, further comprising a display, wherein the position of the sensor enabled object is reproduced on the display.

9. The system of claim 1, further comprising another position sensing modality that is able to globally rebase the system.

10. A method for tracking movement within a 3D environment comprising:
    transmitting signals from at least two beacons located within the 3D environment, wherein each signal transmitted is frequency orthogonal to each other signal transmitted;
    receiving signals from at least one of the at least two beacons at a sensor enabled object having at least one receiver, wherein the sensor enabled object is located within the 3D environment and can be moved with six degrees of freedom;
    processing received signals with a signal processor, wherein the processing of the received signals comprises performing a Fast Fourier Transform on each of the received signals and determining a measurement for each of the received signals that occurs within the 3D environment; and
    determining a position of the sensor enabled object based upon the determined measurements, wherein the position is a position within the 3D environment.

11. The method of claim 10, further comprising a diffuser operably connected to one of the at least two beacons.

12. The method of claim 11, further comprising transmitting a signal more narrowly than another of the transmitted signals.

13. The method of claim 10, wherein measurements of the received signals provide a magnitude for each received signal.

14. The method of claim 13, wherein the magnitude is related to distance from one of the at least two beacons.

15. The method of claim 10, wherein the position of the sensor enabled object is determined based upon is determined based upon the measurements of the received signals and cross-correlation of the measurements with respect to the at least two beacons.

16. The method of claim 10, wherein the position of the sensor enabled object is determined based upon is determined based upon the measurements of the received signals and a known position of the at least two beacons.

17. The method of claim 10, further comprising displaying the determined position of the sensor enabled object on a display.

18. A system for tracking movement comprising:
    at least two beacons, wherein each of the at least two beacons comprises a transmitter, wherein the transmitter is adapted to transmit signals, wherein each of the transmitted signals is frequency orthogonal to each other signal transmitted;
    a sensor enabled object comprising a receiver adapted to receive signals; and
    a signal processor, wherein the signal processor receives signals from the receiver; the signal processor adapted to process the received signals by performing a Fast Fourier Transform and determining a measurement for each received signal from the at least two beacons, wherein a position of the sensor enabled object is determined based upon the measurements of the received signals.

* * * * *